US011070614B2

(12) United States Patent
Tan et al.

(10) Patent No.: US 11,070,614 B2
(45) Date of Patent: Jul. 20, 2021

(54) LOAD BALANCING METHOD AND RELATED APPARATUS

(71) Applicant: HUAWEI TECHNOLOGIES CO., LTD., Guangdong (CN)

(72) Inventors: Shiyong Tan, Beijing (CN); Xiaoqiang Qiao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 9 days.

(21) Appl. No.: 16/258,090

(22) Filed: Jan. 25, 2019

(65) Prior Publication Data

US 2019/0158584 A1 May 23, 2019

Related U.S. Application Data

(63) Continuation of application No. PCT/CN2016/096003, filed on Aug. 19, 2016.

(51) Int. Cl.
*H04L 29/08* (2006.01)
*H04L 12/803* (2013.01)
*G06F 9/455* (2018.01)

(52) U.S. Cl.
CPC ...... *H04L 67/1014* (2013.01); *G06F 9/45558* (2013.01); *H04L 47/125* (2013.01);
(Continued)

(58) Field of Classification Search
CPC ............... H04L 67/1014; H04L 47/125; H04L 67/1008; H04L 67/101; H04L 67/146; G06F 9/45558; G06F 2009/45595

See application file for complete search history.

(56) References Cited

U.S. PATENT DOCUMENTS 6,571,282 B1 5/2003 Bowman-Amuah
6,742,015 B1 5/2004 Bowman-Amuah
(Continued)

FOREIGN PATENT DOCUMENTS

CN 101267587 A 9/2008
CN 102447624 A 5/2012
(Continued)

OTHER PUBLICATIONS

CMCC, Ericsson, ZTE, Samsung, Huawei, Correction for Load Balancing Related cause value CR for 36413. 3GPP TSG-RAN WG3 Meeting #81bis, Venice, Italy, Oct. 7-11, 2013, R3-131812, 7 pages.
(Continued)

*Primary Examiner* — Rupal Dharia
*Assistant Examiner* — Steven C Nguyen
(74) *Attorney, Agent, or Firm* — Westerman, Hattori, Daniels & Adrian, LLP

(57) ABSTRACT

A load balancing method is provided: A load balancer obtains an invalidation notification, where the invalidation notification includes an identifier of an invalid object on a target side, and the invalid object includes an invalid interaction node, an invalid session group on an interaction node, or an invalid session in a session group; the load balancer broadcasts the invalidation notification, where the invalidation notification is used to instruct an interaction node on a source side to delete recorded information about a load balancing protocol of the invalid object; and the load balancer reassigns an interaction node to an application interaction request when the load balancer receives the application interaction request sent by the interaction node on the source side and destination data in the application interaction request is empty. In this way, reliability of message
(Continued)

exchanging is ensured when an interaction node is abnormal.

11 Claims, 7 Drawing Sheets

(52) U.S. Cl.
CPC ........ *H04L 67/101* (2013.01); *H04L 67/1008* (2013.01); *H04L 67/146* (2013.01); *G06F 2009/45595* (2013.01)

(56) References Cited

U.S. PATENT DOCUMENTS

| | | | |
|---|---|---|---|
| 2004/0268357 A1 | 12/2004 | Joy et al. | |
| 2004/0268358 A1* | 12/2004 | Darling | H04L 67/1008 718/105 |
| 2006/0195577 A1* | 8/2006 | Tsuji | H04L 67/1027 709/226 |
| 2007/0233851 A1 | 10/2007 | Ma | |
| 2008/0046142 A1* | 2/2008 | Jordan | H04L 12/40195 701/36 |
| 2008/0144525 A1 | 6/2008 | Crockett et al. | |
| 2008/0298364 A1* | 12/2008 | Blagojevic | H04L 12/1863 370/390 |
| 2010/0023582 A1 | 1/2010 | Pedersen et al. | |
| 2012/0324285 A1 | 12/2012 | Li et al. | |
| 2013/0054817 A1 | 2/2013 | Moen et al. | |
| 2015/0149635 A1* | 5/2015 | Rajagopalan | G06F 9/52 709/226 |
| 2016/0328159 A1* | 11/2016 | Coddington | H04L 43/026 |

FOREIGN PATENT DOCUMENTS

| | | |
|---|---|---|
| CN | 103986653 A | 8/2014 |
| CN | 104348888 A | 2/2015 |
| CN | 104584639 A | 4/2015 |
| CN | 104684025 A | 6/2015 |
| CN | 105120496 A | 12/2015 |
| CN | 105306545 A | 2/2016 |
| CN | 105376317 A | 3/2016 |
| CN | 105743980 A | 7/2016 |
| RU | 2421943 C2 | 6/2011 |
| WO | 2009096833 A1 | 8/2009 |

OTHER PUBLICATIONS

Notice of Allowance dated Mar. 2, 2021, issued in counterpart CN application No. 201680087405.0. (6 pages).

* cited by examiner

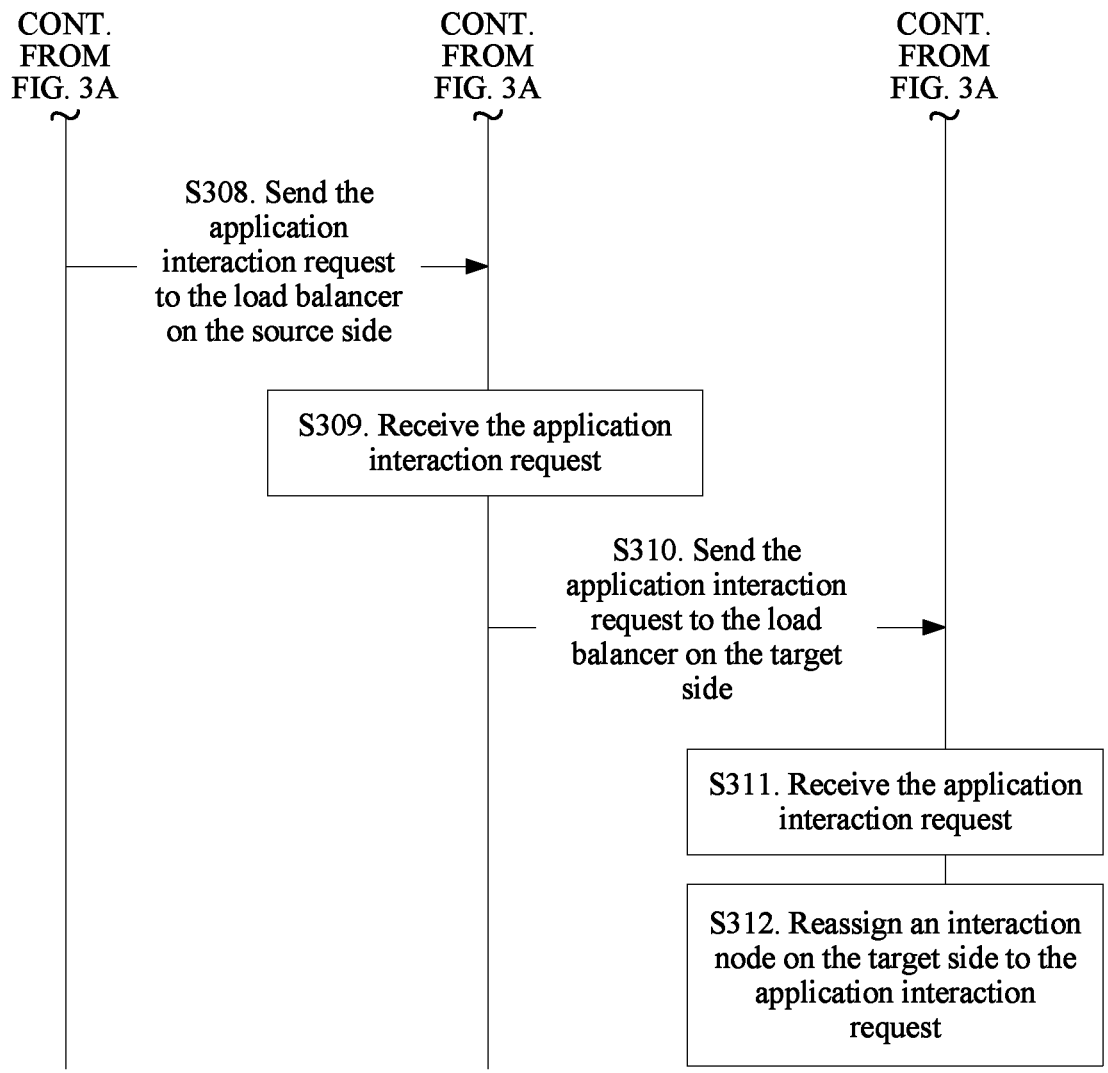

|  |  | Destination LBI | Destination session address |
|---|---|---|---|
|  |  |  |  |
FIG. 6
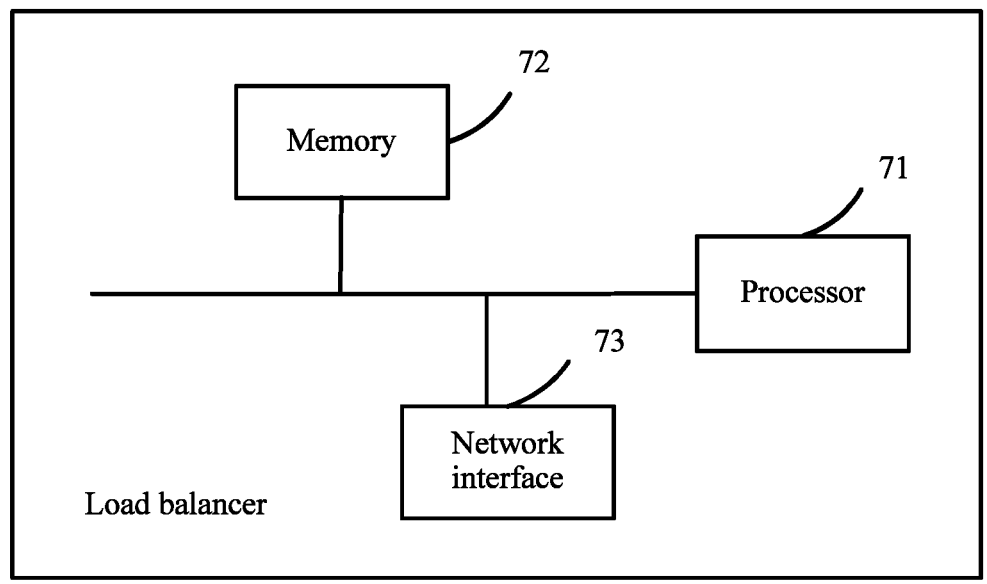
FIG. 7
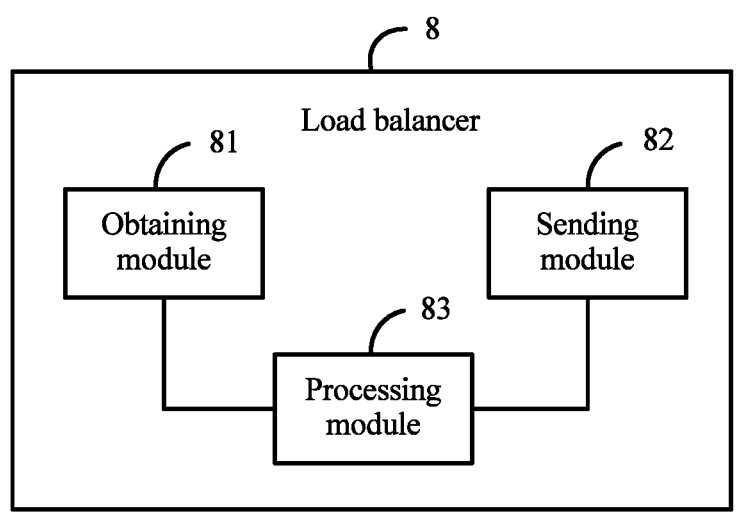
FIG. 8

LOAD BALANCING METHOD AND RELATED APPARATUS

CROSS-REFERENCE TO RELATED APPLICATIONS

This application is a continuation of International Application No. PCT/CN2016/096003, filed on Aug. 19, 2016, the disclosure of which is hereby incorporated by reference in its entirety.

TECHNICAL FIELD

The present disclosure relates to the field of computer technologies, and in particular, to a load balancing method and a related apparatus.

BACKGROUND

In most enterprise-level application and e-commerce application systems, a client and a server usually can complete one transaction or one service only after performing a plurality of interaction processes. These interaction processes are closely related to a user identity. In addition, when performing on operation of these interaction processes, the server usually needs to learn of a processing result of a previous interaction process, or results of several previous interaction processes. Therefore, an application request related to the client usually needs to be forwarded to one server for processing rather than being forwarded by a load balancer to different servers for processing. To meet the foregoing requirement, the load balancer needs to identify a correlation of the interaction processes between the client and the server. In addition, during load balancing, the load balancer further ensures that a series of correlated access requests are dispatched to one server, and this mechanism is referred to as session persistence.

With development of network virtualization technologies, functions of some original network devices evolve into software implementations and are distributed on a plurality of virtual machines (VM), and a general load balancing mechanism is provided, so as to implement wide application of load balancing by providing an independent load balancing protocol layer. However, an existing general load balancing protocol method provides only a basic interaction application scenario, and does not consider how to ensure message exchanging correctness in an abnormal case, for example, when an interaction node is invalid.

SUMMARY

The present disclosure provides a load balancing method and a related apparatus, so as to ensure reliability of message exchanging when an interaction node is abnormal.

One embodiment of the present disclosure provides a load balancing method, including:

obtaining, by a load balancer, an invalidation notification, where the invalidation notification includes an identifier of an invalid object on a target side, and the invalid object includes an invalid interaction node, an invalid session group on an interaction node, or an invalid session in a session group; broadcasting, by the load balancer, the invalidation notification, where the invalidation notification is used to instruct an interaction node on a source side to delete recorded information about a load balancing protocol of the invalid object; and reassigning, by the load balancer, an interaction node to an application interaction request when the load balancer receives the application interaction request sent by the interaction node on the source side and destination data in the application interaction request is empty.

In the technical solution, the load balancer on the target side may notify the interaction node on the source side of the invalidation notification. The invalidation notification carries the identifier of the invalid object on the target side. After receiving the invalidation notification, the interaction node on the source side may learn which interaction node has been invalid and abnormal, and the interaction node on the source side deletes recorded information about the invalid interaction node. When interacting with the invalid interaction node again, the interaction node on the source side generates the application interaction request whose destination data is empty. When the load balancer on the target side receives the application interaction request, because the destination data is empty, the load balancer on the target side may reassign an interaction node to the application interaction request, so as to avoid assigning the application interaction request to the invalid interaction node and ensure reliability of message exchanging.

In one embodiment, the invalidation notification is sent by an interaction node on the target side, and the invalidation notification is constructed by the interaction node on the target side by obtaining an identifier of an invalid session group or an invalid session when detecting that the invalid session group or the invalid session exists on the interaction node on the target side; or the invalidation notification is sent by an operation and maintenance system, and the invalidation notification is constructed by the operation and maintenance system by obtaining an identifier of an invalid interaction node when detecting that the invalid interaction node exists on the target side; or the invalidation notification is constructed by the load balancer by obtaining an identifier of an invalid interaction node when detecting that the invalid interaction node exists on the target side.

In one embodiment, the identifier of the invalid object includes an IP address, a MAC address, or a VLAN address of the invalid object.

In one embodiment, the broadcasting, by the load balancer, the invalidation notification includes: broadcasting, by the load balancer, the invalidation notification to a load balancer on the source side, so that the load balancer on the source side broadcasts the invalidation notification to the interaction node on the source side; or broadcasting, by the load balancer, the invalidation notification to a client.

One embodiment of the present disclosure provides a load balancing method, including:

receiving, by an interaction node on a source side, an invalidation notification, where the invalidation notification includes an identifier of an invalid object on a target side, the invalid object includes an invalid interaction node on the target side, an invalid session group on an interaction node, or an invalid session in a session group; deleting, by the interaction node on the source side, recorded information about a load balancing protocol of the invalid object; and when the interaction node on the source side interacts with the invalid object on the target side, generating, by the interaction node on the source side, an application interaction request whose destination data is empty and sending the application interaction request to a load balancer on the target side.

In one embodiment, the load balancing protocol includes destination data, the destination data includes a first field and a second field, the first field is used to indicate an interaction node on the target side, and the second field is used to indicate a session on the interaction node on the target side; and the deleting, by the interaction node on the source side, recorded information about a load balancing protocol of the invalid object includes:

deleting, by the interaction node on the source side, recorded information that the first field in the load balancing protocol is the interaction node on the target side, when the invalid object is the interaction node on the target side;

deleting, by the interaction node on the source side, recorded information that the first field in the load balancing protocol is the interaction node on the target side and the second field includes a session group on the interaction node on the target side, when the invalid object is the session group on the interaction node on the target side; or deleting, by the interaction node on the source side, recorded information that the first field in the load balancing protocol is the interaction node on the target side and the second field is a session in a session group on the interaction node on the target side, when the invalid object is the session in the session group on the interaction node on the target side.

In one embodiment, the identifier of the invalid object includes an IP address, a MAC address, or a VLAN ID of the invalid object.

In one embodiment, the receiving, by an interaction node on a source side, an invalidation notification includes: receiving, by the interaction node on the source side, the invalidation notification sent by a load balancer on the source side; or receiving, by the interaction node on the source side, the invalidation notification sent by the load balancer on the target side.

One embodiment of the present disclosure provides a load balancer. The load balancer has a function of implementing behavior in the method provided in the first aspect. The function may be implemented by using hardware, or may be implemented by hardware by executing corresponding software. The hardware or the software includes one or more modules corresponding to the foregoing function.

One embodiment of the present disclosure provides a load balancer. The load balancer includes a processor, a memory, and a network interface. The processor is connected to the memory and the network interface. For example, the processor may be connected to the memory and the network interface by using a bus. The network interface includes one or more interfaces. If the network interface includes one interface, the load balancer may be connected to a switching device by using the interface, and is connected to each interaction node on a target side by using the switching device, to communicate with the interaction nodes on the target side. If the network interface includes a plurality of interfaces, the load balancer may be connected to the interaction nodes on the target side by using the plurality of interfaces, to communicate with the interaction nodes on the target side. The processor is configured to execute some or all processes of the embodiments described herein.

One embodiment of the present disclosure provides a computer storage medium. The computer storage medium stores a program, and when being executed, the program includes some or all operations of the load balancing method provided in the embodiments described herein.

One embodiment of the present disclosure provides an interaction node. The interaction node has a function of implementing behavior in the method provided in embodiments described herein. The function may be implemented by using hardware, or may be implemented by hardware by executing corresponding software. The hardware or the software includes one or more modules corresponding to the foregoing function.

One embodiment of the present disclosure provides another interaction node, and the interaction node includes a network interface, a memory, and a processor. Optionally, the interaction node may be connected to a load balancer on a source side by using the network interface, and the memory is configured to store information about a load balancing protocol. The processor is configured to execute some or all processes of the embodiments described herein.

One embodiment of the present disclosure provides a computer storage medium. The computer storage medium stores a program, and when being executed, the program includes some or all operations of the load balancing method provided in the embodiments described herein.

BRIEF DESCRIPTION OF DRAWINGS

To describe the technical solutions in the embodiments of the present disclosure, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 3A and FIG. 3B are a schematic flowchart of a load balancing method according to an embodiment of the present disclosure;

FIG. 4 is a schematic diagram of a data header of a load balancing protocol;

FIG. 6 is a schematic diagram of a data header of another load balancing protocol;

FIG. 7 is a schematic structural diagram of a load balancer according to an embodiment of the present disclosure;

FIG. 8 is a schematic structural diagram of another load balancer according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

An interaction node provided in the embodiments of the present disclosure may be a virtual machine, a physical network element device, or a combination of a virtual machine and a physical network element device. If the interaction node includes a virtual machine, a target virtual machine may be indicated by using a load balancing index (LBI). The load balancing index may be an Internet Protocol (IP) address, a Media Access Control (MAC) address, a virtual local area network (VLAN) address, or the like of the virtual machine. Each virtual machine may include a plurality of session groups, and each session group may include a plurality of sessions. Each session group may have a group identifier, and each session may have an internal address.

If the interaction node is an interaction node on a source side, the interaction node may further be a terminal with a client. The terminal includes but is not limited to a cellphone, a smartphone, a computer, a tablet computer, a personal digital assistant (PDA), a mobile Internet device (MID), a wearable device, an e-book reader, and the like. In the embodiments of the present disclosure, an initiating side of an interaction procedure is referred to as a source side, and a receiving side of the interaction procedure is referred to as a target side.

Figure 1:
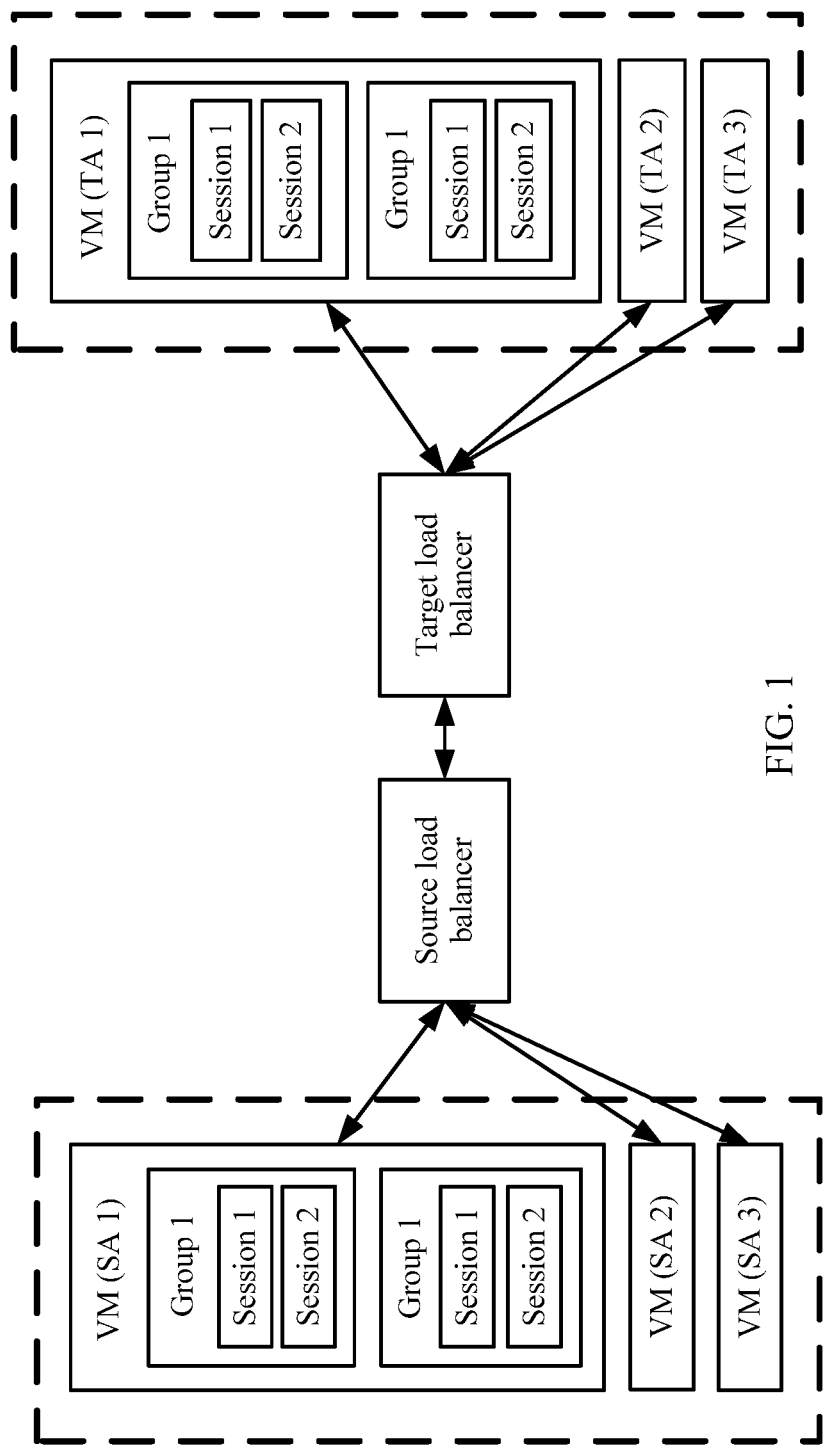
FIG. 1 is a schematic diagram of an interaction scenario of load balancers on two sides.

If the interaction node on the source side is a virtual machine or a physical network element device, the interaction node on the source side may be connected to a load balancer on the source side, the load balancer on the source side is connected to a load balancer on the target side, and the load balancer on the target side is further connected to an interaction node on the target side, as shown in FIG. 1.

Figure 2:
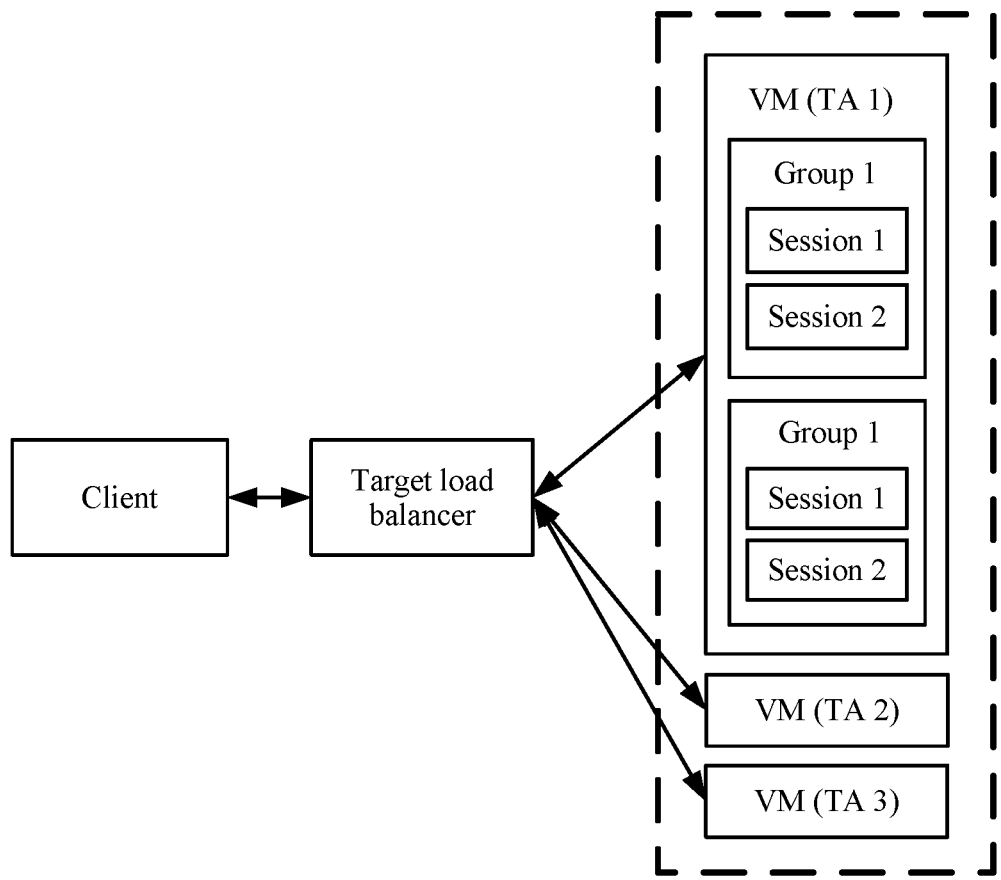
FIG. 2 is a schematic diagram of an interaction scenario of a load balancer on a single side.

If the interaction node on the source side is a terminal with a client, the interaction node on the source side is directly connected to the load balancer on the target side, and the load balancer on the target side is connected to the interaction node on the target side, as shown in FIG. 2. A connection in the embodiments of the present disclosure includes a wired connection or a wireless connection, and a specific connection manner is subject to an actual requirement. The present disclosure sets no limitation.

Figure 3A:
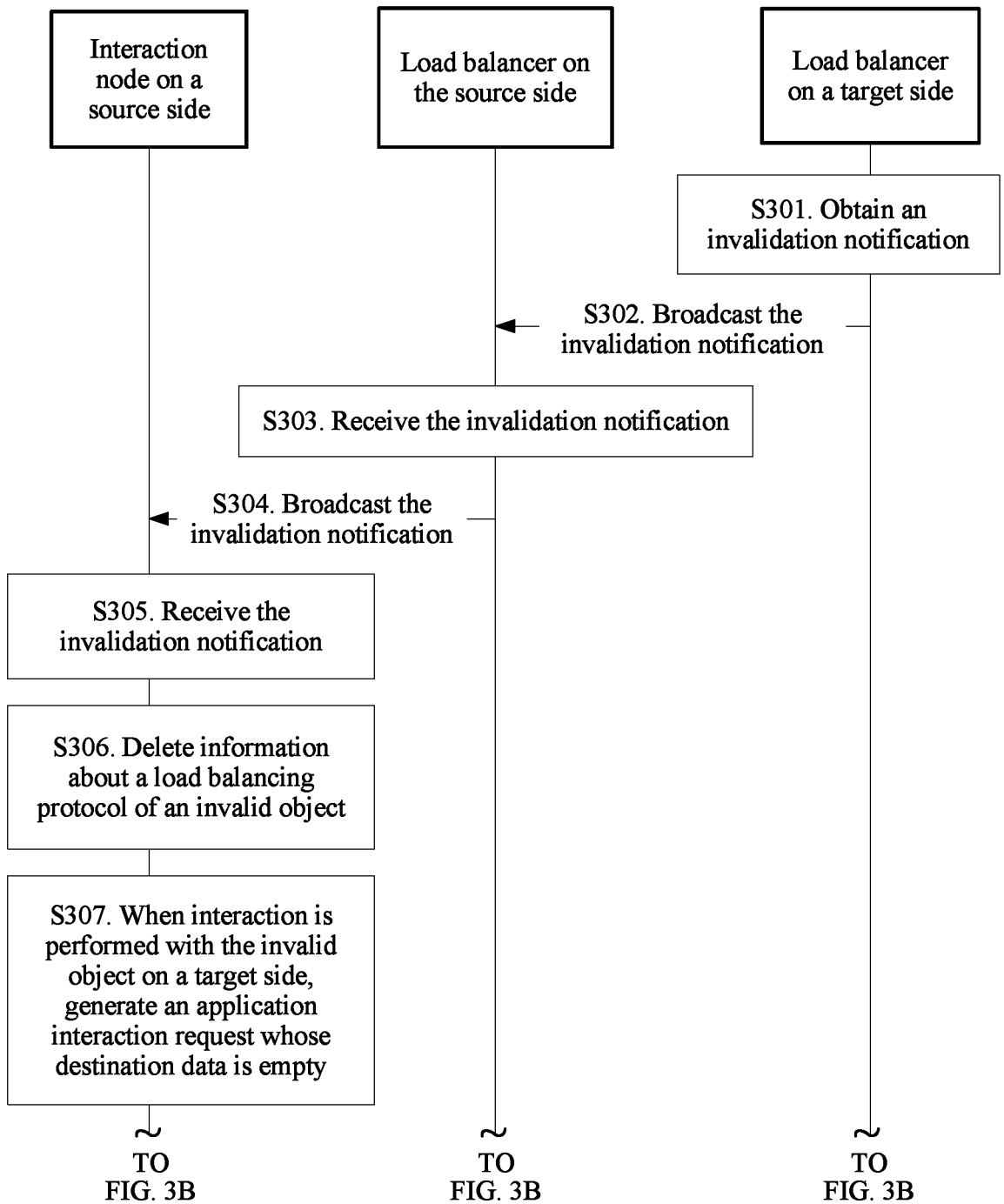

FIG. 3A and FIG. 3B are a schematic flowchart of a load balancing method according to an embodiment of the present disclosure. This embodiment is described on a basis of FIG. 1. As shown in FIG. 3A and FIG. 3B, the method includes the following operations.

S301. A load balancer on a target side obtains an invalidation notification.

The invalidation notification includes an identifier of an invalid object on the target side, and the invalid object includes an invalid interaction node, an invalid session group on an interaction node, or an invalid session in a session group.

In one embodiment, an interaction node on the target side may detect whether an invalid session group exists on the interaction node, or whether an invalid session exists in an internal session group. If an invalid session group exists on the interaction node, or an invalid session exists in the internal session group, the interaction node on the target side constructs the invalidation notification and sends the invalidation notification to the load balancer on the target side. When the invalid object is an internal session group on the interaction node, the invalidation notification includes an identifier of the interaction node and an identifier of the session group; or when the invalid object is a session in the internal session group of the interaction node, the invalidation notification includes an identifier of the interaction node and an identifier of the session, where the identifier of the session may include an identifier of a session group in which the session is located and an internal identifier of the session in the session group of the session.

In another embodiment, an operation and maintenance system may detect whether an invalid interaction node exists on the target side. If an invalid interaction node exists on the target side, the operation and maintenance system constructs the invalidation notification and sends the invalidation notification to the load balancer on the target side. The invalidation notification includes an identifier of the invalid interaction node.

In still another embodiment, the load balancer on the target side may detect whether an invalid interaction node exists on the target side. If an invalid interaction node exists on the target side, the load balancer on the target side constructs the invalidation notification, where the invalidation notification includes an identifier of the invalid interaction node.

S302. The load balancer on the target side broadcasts the invalidation notification.

The load balancer on the target side may be connected to a plurality of load balancers on the source side, that is, after the load balancer on the target side broadcasts the invalidation notification, the load balancers on the source side that are connected to the load balancer on the target side may receive the invalidation notification. Each load balancer on the source side uses a same processing manner after receiving the invalidation notification. In this embodiment of the present disclosure, one of the load balancers on the source side is used as an example for description.

S303. A load balancer on a source side receives the invalidation notification.

S304. The load balancer on the source side broadcasts the invalidation notification.

The load balancer on the source side may be connected to a plurality of interaction nodes on the source side, that is, after the load balancer on the source side broadcasts the invalidation notification, the interaction nodes on the source side that are connected to the load balancer on the source side may receive the invalidation notification. Each interaction node on the source side uses a same processing manner after receiving the invalidation notification. In this embodiment of the present disclosure, one of the interaction nodes on the source side is used as an example for description.

S305. An interaction node on the source side receives the invalidation notification.

S306. The interaction node on the source side deletes information about a load balancing protocol of an invalid object.

A data header of the load balancing protocol is shown in FIG. 4, and includes four fields: a source LBI, a source session address, a destination LBI, and a destination session address. In this embodiment of the present disclosure, the destination LBI and the destination session address are referred to as destination data, and the destination LBI is used to indicate the interaction node on the target side. The destination session address is used to indicate a session on the interaction node on the target side. The source LBI is used to indicate the interaction node on the source side, and the source session address is used to indicate a session on the interaction node on the source side.

A process in which the interaction node on the source side records information about load balancing protocol of the interaction node on the target side is as follows:

①  The interaction node on the source side generates an application interaction request, and the application interaction request complies with the load balancing protocol. The interaction node on the source side assigns a source LBI and a source session address to a data header of the load balancing protocol, and sends the application interaction request to the load balancer on the source side.

② The load balancer on the source side receives the application interaction request, and sends the application interaction request to the load balancer on the target side.

③ The load balancer on the target side receives and parses the application interaction request. Because the application interaction request is an initial request, and destination information is empty or a default value, the load balancer on the target side selects an interaction node for the application interaction request according to a load balancing rule and forwards the application interaction request.

④ The interaction node on the target side receives the application interaction request, performs corresponding service processing and generates an application interaction response, assigns a source LBI and a source session address, writes the source LBI and the source session address in the application interaction request into the load balancing protocol as destination data, and returns the application interaction response to the load balancer on the target side.

⑤ The load balancer on the target side sends the application interaction response to the load balancer on the source side.

⑥ The load balancer on the source side selects a corresponding interaction node based on the source LBI and the source session address, and forwards the application interaction response.

⑦ After receiving the application interaction response, the interaction node on the source side records the source LBI and the source session address in the application interaction response, as destination data for subsequent interaction. Then, when the interaction node on the source side generates a new application interaction request, generated destination data of the load balancing protocol is the source LBI and the source session address that are recorded in advance.

Because the recorded destination data in the load balancing protocol is used to indicate a session on the target side, when receiving an invalidation notification, the interaction node on the source side may determine an invalid object based on an identifier in the invalidation notification, and delete information about the load balancing protocol corresponding to the invalid object.

It is assumed that the destination LBI is a first field, and the destination session address is a second field. That the interaction node on the source side deletes the information about the load balancing protocol may be specifically as follows:

The interaction node on the source side deletes recorded information that the first field in the load balancing protocol is the interaction node on the target side, when the invalid object is the interaction node on the target side;

the interaction node on the source side deletes recorded information that the first field in the load balancing protocol is the interaction node on the target side and the second field includes a session group on the interaction node on the target side, when the invalid object is the session group on the interaction node on the target side; or the interaction node on the source side deletes recorded information that the first field in the load balancing protocol is the interaction node on the target side and the second field is a session in a session group on the interaction node on the target side, when the invalid object is the session in the session group on the interaction node on the target side.

S307. When the interaction node on the source side interacts with the invalid object on the target side, the interaction node on the source side generates an application interaction request whose destination data is empty.

S308. The interaction node on the source side sends the application interaction request to the load balancer on the source side.

S309. The load balancer on the source side receives the application interaction request.

S310. The load balancer on the source side sends the application interaction request to the load balancer on the target side.

S311. The load balancer on the target side receives the application interaction request.

S312. The load balancer on the target side reassigns an interaction node on the target side to the application interaction request.

In the embodiment shown in FIG. 3A and FIG. 3B, the load balancer on the target side may notify the interaction node on the source side of the invalidation notification. The invalidation notification carries the identifier of the invalid object on the target side. After receiving the invalidation notification, the interaction node on the source side may learn which interaction node has been invalid and abnormal, and the interaction node on the source side deletes recorded information about the invalid interaction node. When interacting with the invalid interaction node again, the interaction node on the source side generates the application interaction request whose destination data is empty. When the load balancer on the target side receives the application interaction request, because the destination data is empty, the load balancer on the target side may reassign an interaction node to the application interaction request, so as to avoid assigning the application interaction request to the invalid interaction node and ensure reliability of message exchanging.

Figure 5:
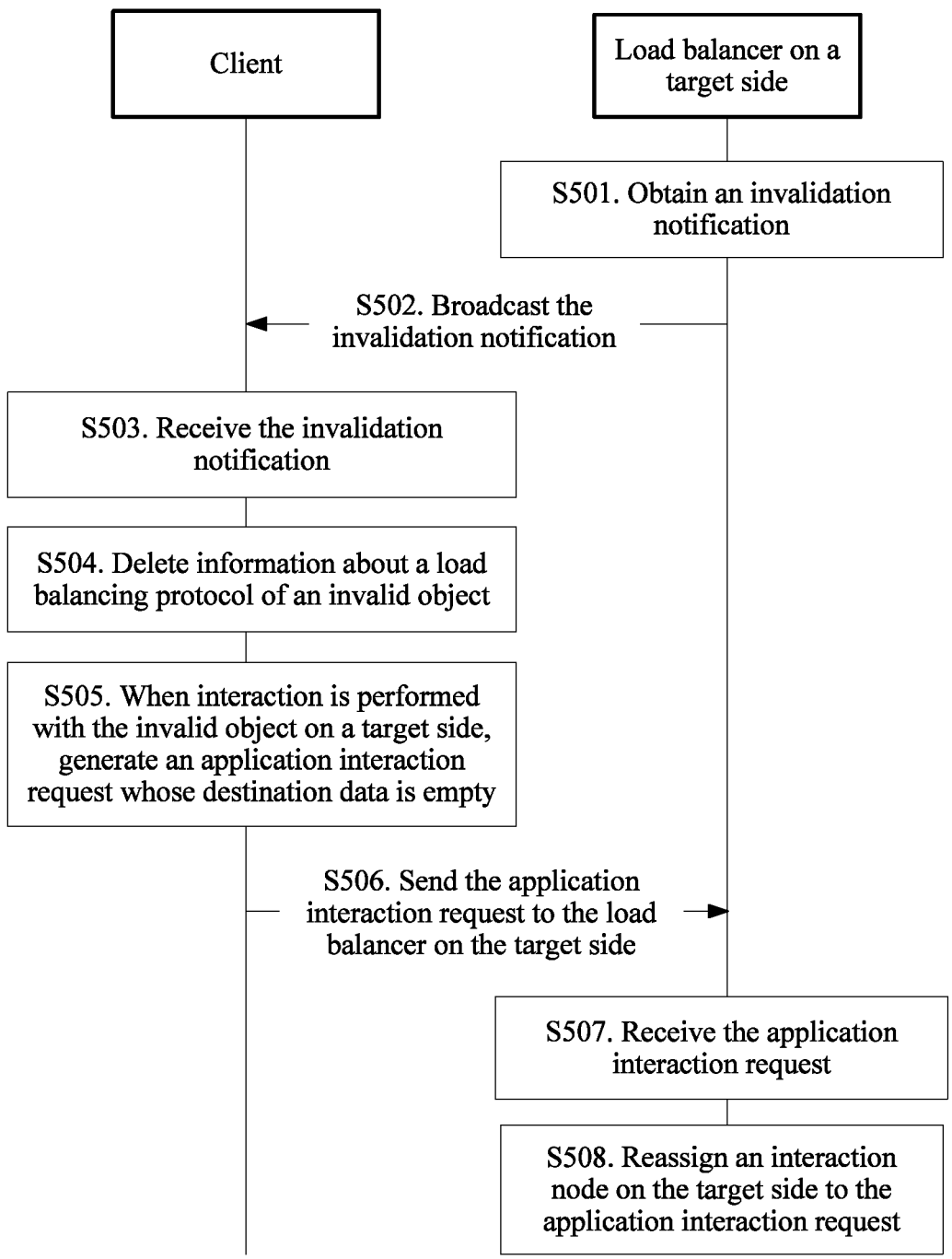
FIG. 5 is a schematic flowchart of another load balancing method according to an embodiment of the present disclosure.

FIG. 5 is a schematic flowchart of another load balancing method according to an embodiment of the present disclosure. This embodiment is described on a basis of FIG. 2. As shown in FIG. 5, the method includes the following operations.

S501. A load balancer on a target side obtains an invalidation notification.

The invalidation notification includes an identifier of an invalid object on the target side, and the invalid object includes an invalid interaction node, an invalid session group on an interaction node, or an invalid session in a session group.

In one embodiment, an interaction node on the target side may detect whether an invalid session group exists on the interaction node, or whether an invalid session exists in an internal session group. If an invalid session group exists on the interaction node, or an invalid session exists in the internal session group, the interaction node on the target side constructs the invalidation notification and sends the invalidation notification to the load balancer on the target side. When the invalid object is the internal session group on the interaction node, the invalidation notification includes an identifier of the interaction node and an identifier of the session group; or when the invalid object is a session in the internal session group on the interaction node, the invalidation notification includes an identifier of the interaction node and identifiers of the session group and the session.

In another embodiment, an operation and maintenance system may detect whether an invalid interaction node exists on the target side. If an invalid interaction node exists on the target side, the operation and maintenance system constructs the invalidation notification and sends the invalidation notification to the load balancer on the target side. The invalidation notification includes an identifier of the invalid interaction node.

In still another embodiment, the load balancer on the target side may detect whether an invalid interaction node exists on the target side. If an invalid interaction node exists on the target side, the load balancer on the target side constructs the invalidation notification, where the invalidation notification includes an identifier of the invalid interaction node.

S502. The load balancer on the target side broadcasts the invalidation notification.

The load balancer on the target side broadcasts the invalidation notification to all clients. Because each client uses a same processing manner after receiving the invalidation notification, one of the clients is used as an example for description in this embodiment of the present disclosure.

S503. A client receives the invalidation notification.

S504. The client deletes information about a load balancing protocol of an invalid object.

A data header of the load balancing protocol is shown in FIG. 6 and is basically the same as the data header shown in FIG. 4. A difference lies in that a source LBI and a source session address in the data header shown in FIG. 6 are empty or default values.

A process in which an interaction node on a source side records the information about the load balancing protocol of the interaction node on the target side is basically the same as that in the operations of S306. A difference lies in that the interaction node on the source side does not assign a source LBI and a source session address to a generated application interaction request, and a source LBI and a source session address in a generated application interaction response of the interaction node on the target side are empty or default values. Remaining operations are the same.

Because the recorded destination data in the load balancing protocol is used to indicate a session on the target side, when receiving an invalidation notification, the interaction node on the source side may determine an invalid object based on an identifier in the invalidation notification, and delete information about the load balancing protocol of the invalid object.

It is assumed that a destination LBI is a first field, and a destination session address is a second field. That the interaction node on the source side deletes the information about the load balancing protocol may be specifically as follows:

The interaction node on the source side deletes recorded information that the first field in the load balancing protocol is the interaction node on the target side, when the invalid object is the interaction node on the target side;

the interaction node on the source side deletes recorded information that the first field in the load balancing protocol is the interaction node on the target side and the second field includes a session group on the interaction node on the target side, when the invalid object is the session group on the interaction node on the target side; or the interaction node on the source side deletes recorded information that the first field in the load balancing protocol is the interaction node on the target side and the second field is a session in a session group on the interaction node on the target side, when the invalid object is the session in the session group on the interaction node on the target side.

S505. When the client interacts with the invalid object on the target side, the client generates an application interaction request whose destination data is empty.

S506. The client sends the application interaction request to the load balancer on the target side.

S507. The load balancer on the target side receives the application interaction request.

S508. The load balancer on the target side reassigns an interaction node on the target side to the application interaction request.

In the embodiment shown in FIG. 5, the load balancer on the target side may notify the client of the invalidation notification. The invalidation notification carries the identifier of the invalid object on the target side. After receiving the invalidation notification, the client may learn which interaction node has been invalid and abnormal, and the client deletes recorded information about the invalid interaction node. When interacting with the invalid interaction node again, the client generates the application interaction request whose destination data is empty. When the load balancer on the target side receives the application interaction request, because the destination data is empty, the load balancer on the target side may reassign an interaction node to the application interaction request, so as to avoid assigning the application interaction request to the invalid interaction node and ensure reliability of message exchanging.

FIG. 7 is a schematic structural diagram of a load balancer according to an embodiment of the present disclosure. As shown in FIG. 7, the load balancer includes a processor 71, a memory 72, and a network interface 73. The processor 71 is connected to the memory 72 and the network interface 73. For example, the processor 71 may be connected to the memory 72 and the network interface 73 by using a bus.

The processor 71 is configured to support the load balancer in executing a corresponding function in the foregoing method. The processor 71 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 72 may include a volatile memory, for example, a random access memory (RAM). The memory 72 may also include a non-volatile memory, for example, a read-only memory (ROM), a flash memory, a hard disk drive (HDD), or a solid-state drive (SSD). The memory 72 may further include a combination of the foregoing types of memories.

The network interface 73 includes one or more interfaces. If the network interface 73 includes one interface, the load balancer may be connected to a switching device by using the interface, and is connected to each interaction node on a target side by using the switching device, to communicate with the interaction nodes on the target side. If the network interface 73 includes a plurality of interfaces, the load balancer may be connected to the interaction nodes on the target side by using the plurality of interfaces, to communicate with the interaction nodes on the target side.

The processor 71 may execute the following operations:

obtaining an invalidation notification, where the invalidation notification includes an identifier of an invalid object on the target side, and the invalid object includes an invalid interaction node, an invalid session group on an interaction node, or an invalid session in a session group; broadcasting the invalidation notification, where the invalidation notification is used to instruct an interaction node on a source side to delete recorded information about a load balancing protocol of the invalid object; and reassigning an interaction node to an application interaction request when the processor 71 receives the application interaction request sent by the interaction node on the source side and destination data in the application interaction request is empty.

The invalidation notification is sent by the interaction node on the target side, and the invalidation notification is constructed by the interaction node on the target side by obtaining an identifier of an invalid session group or an invalid session when detecting that the invalid session group or the invalid session exists on the interaction node on the target side; or the invalidation notification is sent by an operation and maintenance system, and the invalidation notification is constructed by the operation and maintenance system by obtaining an identifier of an invalid interaction node when detecting that the invalid interaction node exists on the target side; or the invalidation notification is constructed by the processor 71 by obtaining an identifier of an invalid interaction node when detecting that the invalid interaction node exists on the target side.

FIG. 8 is a schematic structural diagram of another load balancer according to an embodiment of the present disclosure. As shown in FIG. 8, a load balancer 8 includes an obtaining module 81, a sending module 82, and a processing module 83. The processing module 83 implements the function of the processor shown in FIG. 7. In combination with the obtaining module 81, the sending module 82 implements the function of the network interface shown in FIG. 7.

Figure 9:
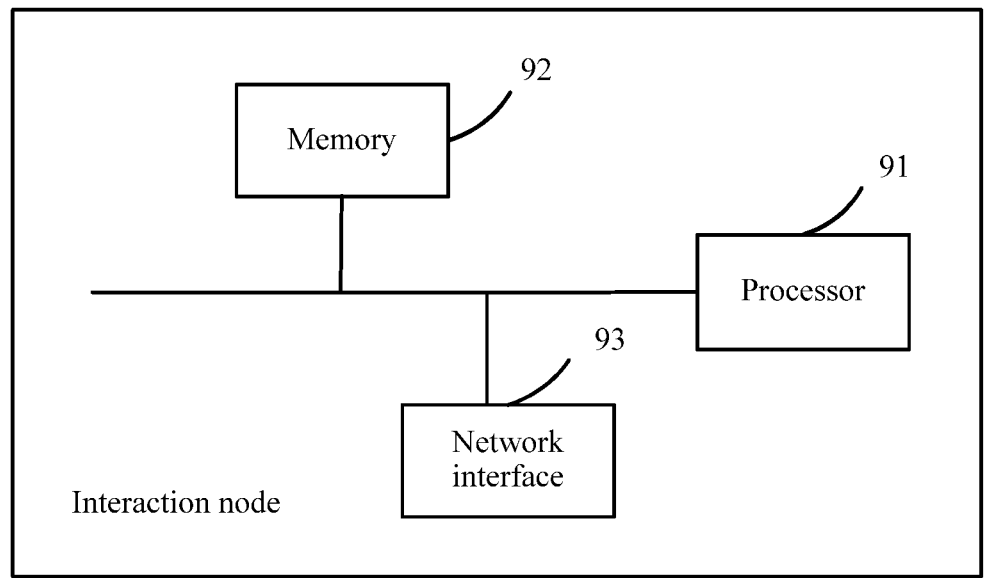
FIG. 9 is a schematic structural diagram of an interaction node according to an embodiment of the present disclosure.

FIG. 9 is a schematic structural diagram of an interaction node according to an embodiment of the present disclosure. As shown in FIG. 9, the interaction node includes a processor 91, a memory 92, and a network interface 93. The processor 91 is connected to the memory 92 and the network interface 93. For example, the processor 91 may be connected to the memory 92 and the network interface 93 by using a bus.

The processor 91 is configured to support the interaction node in executing a corresponding function in the foregoing method. The processor 91 may be a CPU, an NP, a hardware chip, or any combination thereof. The hardware chip may be an ASIC, a PLD, or a combination thereof. The PLD may be a CPLD, an FPGA, a GAL, or any combination thereof.

The memory 92 is configured to store information about a load balancing protocol. The memory 92 may include a volatile memory such as a RAM; the memory 92 may include a non-volatile memory such as a ROM, a flash memory, an HDD, or an SSD; and the memory 92 may include a combination of the foregoing types of memories.

The processor 91 may execute the following operations:
receiving an invalidation notification, where the invalidation notification includes an identifier of an invalid object on a target side, the invalid object includes an invalid interaction node on the target side, an invalid session group on an interaction node, or an invalid session in a session group; deleting recorded information about a load balancing protocol of the invalid object; and when the processor 91 interacts with the invalid object on the target side by using the network interface 93, generating an application interaction request whose destination data is empty and sending the application interaction request to a load balancer on the target side.

The load balancing protocol includes destination data, the destination data includes a first field and a second field, the first field is used to indicate an interaction node on the target side, and the second field is used to indicate a session on the interaction node on the target side.

The deleting, by the processor 91, recorded information about a load balancing protocol of the invalid object includes:
deleting recorded information that the first field in the load balancing protocol is the interaction node on the target side, when the invalid object is the interaction node on the target side;
deleting recorded information that the first field in the load balancing protocol is the interaction node on the target side and the second field includes a session group on the interaction node on the target side, when the invalid object is the session group on the interaction node on the target side; or deleting recorded information that the first field in the load balancing protocol is the interaction node on the target side and the second field is a session in a session group on the interaction node on the target side, when the invalid object is the session in the session group on the interaction node on the target side.

Figure 10:
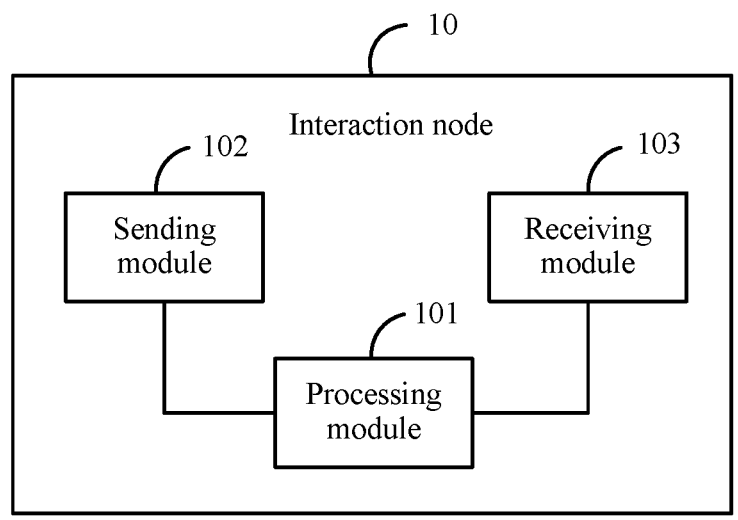
FIG. 10 is a schematic structural diagram of another interaction node according to an embodiment of the present disclosure.

FIG. 10 is a schematic structural diagram of another interaction node according to an embodiment of the present disclosure. As shown in FIG. 10, an interaction node 10 includes a processing module 101, a sending module 102, and a receiving module 103. The processing module 101 implements the function of the processor shown in FIG. 9. In combination with the receiving module 103, the sending module 102 implements the function of the network interface shown in FIG. 9.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What are disclosed above are merely examples of embodiments of the present disclosure, and certainly are not intended to limit the scope of the claims of the present disclosure. Therefore, equivalent variations made in accordance with the claims of the present disclosure shall fall within the scope of the present disclosure.

What is claimed is:

1. A load balancing method, comprising:
obtaining, by a load balancer, an invalidation notification, wherein the invalidation notification comprises an identifier of an invalid object on a target side, and the invalid object comprises an invalid interaction node, an invalid session group on an interaction node, or an invalid session in a session group;
sending, by the load balancer, the invalidation notification to a second interaction node on a source side;
receiving, by the second interaction node, the invalidation notification;
deleting, by the second interaction node, recorded information of the invalid object in response to the invalidation notification;
sending, by the second interaction node, an application interaction request, wherein destination data in the application interaction request is null;
receiving, by the load balancer, the application interaction request from the second interaction node on the source side; and
reassigning, by the load balancer, a third interaction node in response to the application interaction request;
sending, by the load balancer, the application interaction request to the third interaction node.

2. The method according to claim 1, wherein obtaining the invalidation notification comprises:
receiving, by the load balancer, the invalidation notification from an interaction node on the target side, and the invalidation notification is constructed by the interaction node on the target side by obtaining an identifier of an invalid session group or an invalid session when detecting that the invalid session group or the invalid session exists on the interaction node on the target side.

3. The method according to claim 1, wherein obtaining the invalidation notification comprises:
receiving, by the load balancer, the invalidation notification from an operation and maintenance system, and the invalidation notification is constructed by the operation and maintenance system by obtaining an identifier of an invalid interaction node when detecting that the invalid interaction node exists on the target side.

4. The method according to claim 1, wherein obtaining the invalidation notification comprises:
constructing, by the load balancer, the invalidation notification by obtaining an identifier of an invalid interaction node when detecting that the invalid interaction node exists on the target side.

5. A load balancer, comprising:
an interface;
a processor; and
a non-transitory computer-readable storage medium storing a program to be executed by the processor, the program including instructions to:
obtain an invalidation notification, wherein the invalidation notification comprises an identifier of an invalid object on a target side, and the invalid object comprises an invalid interaction node, an invalid session group on an interaction node, or an invalid session in a session group;
send, using the interface, the invalidation notification to a second interaction node on a source side, wherein the invalidation notification is used to instruct the second interaction node on the source side to delete recorded information about a load balancing protocol of the invalid object;
receive, using the interface, an application interaction request from the second interaction node on the source side, wherein destination data in the application interaction request is null; and
reassign a third interaction node in response to the application interaction request;
send the application interaction request to the third interaction node.

6. The load balancer according to claim 5, wherein to obtain the invalidation notification, the program includes instructions to:
receive, using the interface, the invalidation notification from an interaction node on the target side, and the invalidation notification is constructed by the interaction node on the target side by obtaining an identifier of an invalid session group or an invalid session when detecting that the invalid session group or the invalid session exists on the interaction node on the target side.

7. The load balancer according to claim 5, wherein to obtain the invalidation notification, the program includes instructions to:
receive, using the interface, the invalidation notification from an operation and maintenance system, and the invalidation notification is constructed by the operation and maintenance system by obtaining an identifier of an invalid interaction node when detecting that the invalid interaction node exists on the target side.

8. The load balancer according to claim 5, wherein to obtain the invalidation notification, the program includes instructions to:
construct, the invalidation notification by obtaining an identifier of an invalid interaction node when detecting that the invalid interaction node exists on the target side.

9. An operation and maintenance system, comprising:
a load balancer including a first processor in communication with a first memory storing a first program;
a second interaction node on a source side, the second interaction node including a second processor in communication with a second memory storing a second program; and
a third interaction node, wherein the first processor of the load balancer executes the first program to obtain an invalidation notification, the invalidation notification comprises an identifier of an invalid object on a target side, and the invalid object comprises an invalid interaction node, an invalid session group on an interaction node, or an invalid session in a session group,
the first processor of the load balancer executes the first program to send the invalidation notification to the second interaction node on the source side,
the second interaction node receives the invalidation notification,
the second processor of the second interaction node executes the second program to delete recorded information of the invalid object in response to the invalidation notification,
the second processor of the second interaction node executes the second program to send an application interaction request, and destination data in the application interaction request is null,
the load balancer receives the application interaction request from the second interaction node on the source side, and
the first processor of the load balancer executes the first program to reassign the third interaction node in response to the application interaction request, and
the first processor of the load balancer executes the first program to send the application interaction request to the third interaction node.

10. The operation and maintenance system according to claim 9, wherein the first processor of the load balancer receives the invalidation notification from an interaction node on the target side, and the invalidation notification is constructed by the interaction node on the target side by obtaining an identifier of an invalid session group or an invalid session when detecting that the invalid session group or the invalid session exists on the interaction node on the target side.

11. The operation and maintenance system according to claim 9, wherein the first processor of the load balancer executes the first program to construct the invalidation notification by obtaining an identifier of an invalid interaction node when detecting that the invalid interaction node exists on the target side.

* * * * *